March 22, 1938. I. J. KRCHMA 2,111,788
PROCESS AND APPARATUS FOR THE REMOVAL OF IMPURITIES
FROM TITANIUM SULPHATE SOLUTIONS
Filed March 20, 1935

INVENTOR.
Ignace J. Krchma.
BY
Albert B. Griggs
ATTORNEY.

Patented Mar. 22, 1938

2,111,788

UNITED STATES PATENT OFFICE

2,111,788

PROCESS AND APPARATUS FOR THE REMOVAL OF IMPURITIES FROM TITANIUM SULPHATE SOLUTIONS

Ignace J. Krchma, Brooklyn, Md., assignor, by mesne assignments, to E. I. du Pont de Nemours and Company, a corporation of Delaware Application March 20, 1935, Serial No. 11,928

9 Claims. (Cl. 23—117)

This invention relates to the removal of colloidal slimes from liquid media, especially titanium sulphate solutions, and is particularly directed to processes and apparatus wherein a flocculating agent is added to the liquid in such a way as to accomplish a complete flocculation of colloidal slimes without such agitation as would damage the flocs which form.

The removal of colloidal slimes from liquid media has presented considerable difficulty in the past. Such insoluble, colloidal material cannot, of course, be separated from a liquid medium by decantation or filtration without first coagulating the colloidal matter. The methods of separation involving coagulation have not been overly successful heretofore, as a considerable period of time has been required and as the separation has not been as complete as might be desired. The difficulties arose, largely, by reason of the fact that the art usually attempts to mix a flocculating agent with a large body of liquid. In order to distribute the coagulant thru the liquid, considerable agitation is required and the flocs which form are badly damaged. It does not seem possible, by prior art methods, to obtain adequate distribution of the flocculating agent without causing serious damage to flocs. This difficulty is particularly great when glue and similar materials are used as coagulants.

It is an object of my invention to provide a process and apparatus whereby a quick, simple, and complete separation of colloidal slimes can be effected without encountering the difficulties which have hitherto harassed those working in the art. A further object of my invention is to provide continuous processes, and apparatus therefor, whereby less equipment, less space, and less time are required for purification of a given volume of liquid. It is particularly an object of my invention to provide processes and apparatus whereby a quick, simple, and complete separation of colloidal slimes from titanium sulphate solutions can be effected. In connection with this latter object it is noted that a very complete separation of colloidal material from titanium sulphate is required, or else a titanium dioxide prepared therefrom by hydrolysis will be contaminated. Other objects will appear hereinafter.

I accomplish my objects by carefully controlling the rate and manner of addition of coagulating agents to the solution to be treated, and by preserving flocs formed from disintegration. I preferably proceed in a continuous manner.

Figure 1:
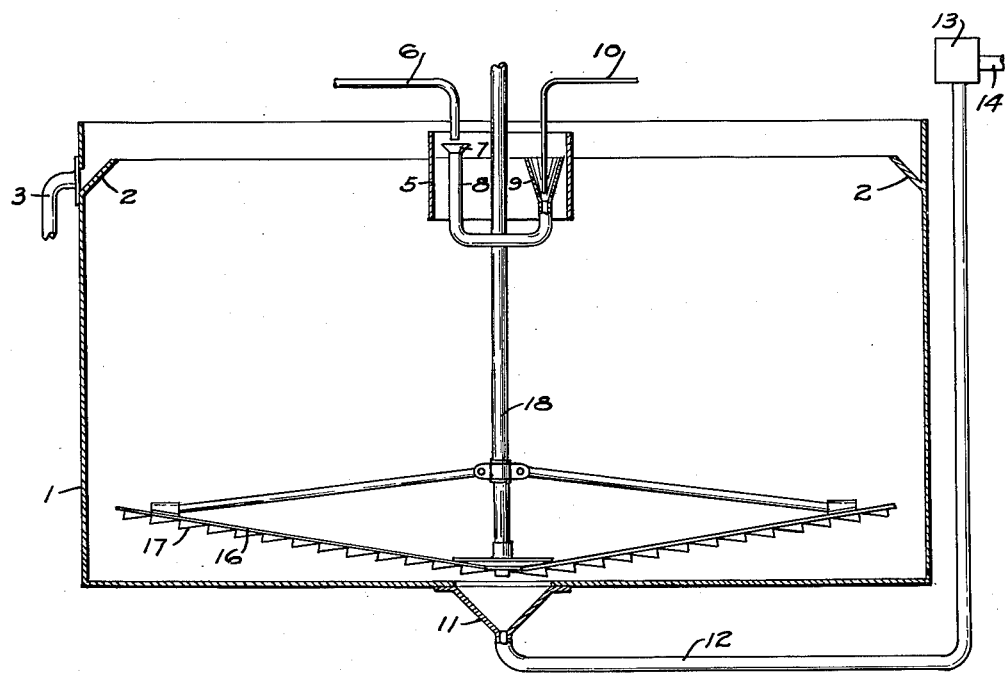
Figure 1 illustrates a sectional plan view of a preferred embodiment of my novel apparatus.
Figure 2:
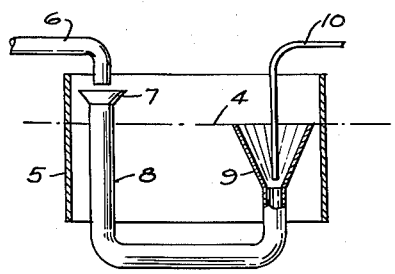
Figure 2 is a more detailed view of the loading well of Figure 1.

Referring in more detail to the apparatus of Figures 1 and 2 there is seen a tank 1 provided near the top with an overflow launder 2 and a pipe 3 for leading away clear solution. The solution level in tank 1 is, of course, at the top of overflow launder 2. The solution level in Figure 2 is shown by dash and dot line 4. The loading well, best seen in Figure 2, comprises an open cylinder 5 which is located with its top above the liquid level and with its lower edge a considerable distance below the liquid level. The liquid to be purified is discharged from an inlet tube 6 into a small funnel 7 on a U-shaped tube 8. The tube 8 terminates, as shown, in a frusto-conical element 9, open at both ends. This funnel shaped member 9 is located so its large opening is at the liquid level. For introducing a coagulant for the colloidal material in the incoming liquid, there is provided a pipe 10 which terminates within the small end of element 9. The settled slimes are removed thru a cone 11 at the bottom of tank 1, and are drawn thru pipe 12 by pump 13 and discharged thru pipe 14. The settled material is drawn towards the cone by blades 17 on arm 16. The arm 16 is slowly rotated by shaft 18.

Figure 3:
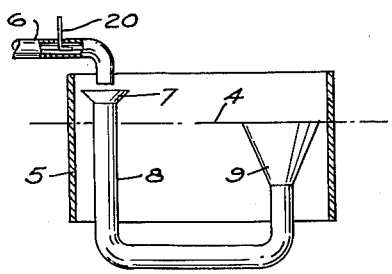
Figure 3 is a similar view of a modified loading well.

The modified loading well of Figure 3 is the same as that described in connection with Figures 1 and 2, except that the coagulant is added in the inlet pipe 6 by a tube 20.

My apparatus may be used for the treatment of various colloid-containing liquids, but it has found its greatest usefulness in the purification of titanium sulphate solutions. I shall now consider the operation of the apparatus in connection with processes illustrative of my invention.

In the manufacture of titanium sulphate solutions a titanium-iron ore is treated with sulphuric acid and the resulting attack mass leached with water. A large proportion of the ore dissolves, but a certain minor amount remains insoluble. In order to make a solution suitable for hydrolysis of the titanium sulphate to pure, uncontaminated $TiO_2$, it is first necessary to remove these undissolved materials. Some may easily be removed by a preliminary hydro separation and classification of known type. After this simple purification there remains a substantial quantity of very finely divided slime consisting, essentially, of titanium oxides, iron oxides, and silicon oxides. A typical solution at this point had the following analysis:

| | Grams per liter |
|---|---|
| $TiO_2$ | 145 |
| Fe | 110 |
| Total $H_2SO_4$ (free and combined) | 500 |
| Colloidal muds | 20 |

The insoluble solids are quite colloidal and cannot be removed by settling or filtration without first destroying their colloidal character.

I preferably accomplish a separation by adding glue to the solution. As seen in Figures 1 and 2 the solution is led thru pipe 6 into pipe 8. The glue is added thru pipe 10 to the solution as it emerges from pipe 8 into funnel 9. The solution flowing thru pipe 8 is moving rather rapidly and is a rather turbulent stream. The glue is added to this rather turbulent flow and is, therefore, mixed uniformly with the solution as it passes to the top of funnel 9. As the solution rises in funnel 9 the rate of flow becomes slower and the turbulence less, until at the top of the funnel the solution quietly overflows into the loading well proper with substantially no agitation of the flocculated material already present. In this way the glue is gently, but thoroughly, mixed with the solution and as flocs form the agitation of the liquid decreases so as not to damage them.

The flocculated slimes settle to the bottom of tank 1 and are drawn off thru cone 11. The clear solution overflows thru pipe 3 and may be submitted to any desired further treatment.

The modified well of Figure 3 is used in a similar manner. The coagulant is added thru pipe 20, and, consequently, is more thoroughly mixed with the solution under treatment than was the glue. This modification was found particularly useful when copper sulphide was used as a coagulant. The copper sulphide was formed in situ by previously adding hydrogen sulphide and then adding copper sulphate solution thru tube 20. The increased time of mixing obtained by adding the copper sulphate at a point remote from funnel 9 permits the reaction between copper sulphate and hydrogen sulphide to go to completion before the solution is discharged from funnel 9, and permits a complete coagulation of the colloidal slimes. Similar factors must, of course, be considered when other suitable metal sulphides are used as flocculating agents.

If the coagulant were simply added to a batch of solution, the agitation required completely to mix the solution and coagulant would be enough to break up some of the flocs. I accomplish a complete intermingling of solution and coagulant quickly and before flocculation is complete, thus avoiding breaking up the flocs which form. The difference between my preferred method of adding the coagulant and methods of simply adding the coagulant to the main batch, or of adding with agitation, is most marked when glue or similar coagulants are used.

I may use any coagulant which will operate satisfactorily to flocculate the colloidal slimes. My processes and apparatus show most markedly their advantages when hydrophylic colloids are used as coagulants. Among the hydrophylic colloids, I have obtained excellent results with glue, gelatine, blood, albuminoid materials generally, and the like, but glue has been the most satisfactory. Other known flocculating agents may, of course, be used, and, in addition to the agents above mentioned, I may use metal sulphides which are insoluble in 10% sulphuric acid such as copper sulphide, arsenic sulphide, and lead sulphide.

The point of addition of the flocculating agent will depend upon the amount of mixing necessary to obtain satisfactory coagulation without breaking the flocs. With glue very little mixing is necessary, or permissible, and, as seen in Figure 2, the glue is added at the lower end of funnel 9. On the other hand, the copper sulphate addition was made at 20, as seen in Figure 3, because a longer time and more intermingling is required than for glue. Similarly, for any coagulant, the distance from the outlet of funnel 9 at which the addition is made will depend upon the extent of mixing required to obtain satisfactory coagulation and the amount of agitation permissible without damage to the flocs. That is, the flocculating agent is added at such a point that during the turbulent flow of liquid the flocs are not entirely formed, and as the flocs form the flow becomes slower so as to avoid damage to them by reason of agitation of the liquid.

Instead of operating in a continuous manner, I may operate my process discontinuously. The latter procedure, however, is not as satisfactory, particularly as it is difficult to obtain no more than the required amount of agitation in a discontinuous process.

Instead of decanting I may filter the solution, but, as the agitation incident to filtration tends to break up the flocs unless there is only a very small amount of colloidal material present, filtration is ordinarily none too satisfactory.

The clarified solution obtained by my processes as above described is substantially free from colloidal slime, but it is subsequently necessary to reclarify the solution before hydrolysis. In the usual course, the clarified solution obtained according to my above described process is treated to remove ferrous sulphate, and the treated solution, after addition of a filter-aid such as kieselguhr or celite, is reclarified by filtration. After the reclarification, the solution is concentrated by evaporation, then hydrolized, and, finally, filtered to separate the titanium hydrate.

The final filtration is often very slow and very difficult. I have found that the difficulties are attributable to the presence of colloidal material in the hydrolyzed solution. The colloidal material is largely hydrated, colloidal silica and colloidal $TiO_2$. The solutions containing this highly colloidal material appear quite free from suspended matter when examined by optical means. There is not even a discernible Tyndall effect.

In order to avoid the difficulties heretofore encountered in the final filtration, it is necessary only to treat the solution, prior to hydrolysis, with glue, or the like, and to filter. The glue may be added at any convenient time between the primary clarification and the hydrolysis. If an excess of glue be used in the first clarification, above described in detail, the colloidal material which is not coagulated in the first clarification will subsequently be coagulated, and will be removed by a second clarification step. It is noted that the advantages of the second clarification step are most apparent when metal sulphides which are insoluble in 10% sulphuric acid, such as copper sulphide, lead sulphide, and arsenic sulphide, are used in the first clarification.

When copper sulphide and the like are used in the first clarification, or even sometimes when glue is used, it is preferred to add a small amount of glue to the solution just prior to a second clarification. The colloidal material is thus removed by the second clarification, and it does not remain to interfere with the filtration after hydrolysis. According to this mode of operation the glue can be added as in the first clarification, above described in detail, and the solution filtered. However, in view of the fact that very little colloidal material is present, it is usually quite satisfactory simply to add the glue directly to the batch and then to filter.

It will readily be apparent that the second clarification may be accomplished with equivalents of glue, such as gelatine, blood, and albuminoid materials generally. However, glue has given by far the best results and I usually prefer to use it.

While I have disclosed a number of specific processes and forms of apparatus, it will be readily apparent that numerous modifications thereof can be made without departing from the spirit of my invention. I do not intend, therefore, to be limited to the illustrative processes and apparatus described, the scope of my invention appearing from the following claims.

I claim:

1. An apparatus for the removal of colloidal material from a liquid containing the same, comprising a receptacle, a cylindrical loading well open at its bottom within said receptacle, means leading into the loading well for conducting a flow of liquid, interconnecting frusto-conical means located with its larger end substantially at the normal liquid level in the receptacle, means for introducing a coagulant into the means for conducting a flow of liquid, means for continuously withdrawing liquid from the top of the receptacle, and means for continuously withdrawing flocculated material from the bottom of the receptacle.

2. An apparatus for the removal of colloidal material from a liquid containing the same, comprising a receptacle, independent tubular means for conducting a flow of the liquid, and a conduit of increasing cross-section the smaller end of which communicates with the said tubular means and the larger end of which is located not substantially higher than the normal liquid level in the receptacle, and means associated with said tubular means and conduit for introducing a coagulant into the liquid flowing therethrough.

3. An apparatus for the removal of colloidal material from a liquid containing the same, comprising a receptacle, separate tubular means for conducting a flow of the liquid, a conduit of increasing cross-section the smaller end of which communicates with the said tubular means and the larger end of which is located not substantially higher than the normal liquid level in the receptacle, and a pipe for adding coagulant to liquid carried by said conduit.

4. An apparatus for the removal of colloidal material from a liquid containing the same, comprising a receptacle, a cylindrical loading well open at its bottom, tubular means for conducting a flow of the liquid, a conduit of increasing cross-section located within the loading well the smaller end of the conduit communicating with the said tubular means and the larger end of the conduit being positioned substantially at the normal liquid level in the receptacle, and a pipe for introducing a coagulant into the liquid carried by said conduit.

5. An apparatus for the removal of colloidal material from a liquid containing the same, comprising a receptacle, a cylindrical loading well open at its bottom, tubular means for conducting a flow of the liquid, a conduit of increasing cross section located within the loading well the smaller end of the conduit communicating with the said tubular means and the larger end of the conduit being positioned substantially at the normal liquid level in the receptacle, a pipe for introducing a coagulant into the liquid carried by said conduit, means for continuously withdrawing liquid from the top of the receptacle, and means for continuously withdrawing flocculated material from the bottom of the receptacle.

6. In a continuous process of removing colloidal material from a liquid containing the same, the steps comprising causing a restricted flow of the liquid, continuing the flow of the liquid and increasing the cross-sectional area of the flow to decrease its velocity and turbulence, introducing a flocculating material into the flow countercurrent to the flow of the liquid and at a point close to where the liquid increases in cross sectional area, discharging the liquid after its cross sectional area has been substantially increased into a relatively restricted area where said liquid descends towards the bottom of the receptacle, the flocculating slimes remaining on the bottom and the clear supernatant liquid flowing upward.

7. In a continuous process of removing colloidal material from a solution of titanium sulphate containing the same, the steps comprising causing a restricted flow of the liquid, continuing the flow of the liquid and increasing the cross-sectional area of the flow to decrease its velocity and turbulence, introducing a flocculating material into the flow countercurrent to the flow of the liquid and at a point close to where the liquid increases in cross sectional area, discharging the liquid after its cross sectional area has been substantially increased into a relatively restricted area where said liquid descends towards the bottom of the receptacle, the flocculating slimes remaining on the bottom and the clear supernatant liquid flowing upward.

8. In a continuous process of removing colloidal material from a liquid containing the same, the steps comprising causing a restricted flow of the liquid, continuing the flow of the liquid and increasing the cross-sectional area of the flow to decrease its velocity and turbulence, introducing a flocculating agent selected from the class consisting of glue, blood, gelatine, and albuminoid materials, into the flow countercurrent to the flow of the liquid and at a point close to where the liquid increases in cross sectional area, discharging the liquid after its cross sectional area has been substantially increased into a relatively restricted area where said liquid descends towards the bottom of the receptacle, the flocculating slimes remaining on the bottom and the clear supernatant liquid flowing upward.

9. In a continuous process of removing colloidal material from a liquid containing the same, the steps comprising causing a restricted flow of the liquid, continuing the flow of the liquid and increasing the cross-sectional area of the flow to decrease its velocity and turbulence, introducing glue into the flow countercurrent to the flow of the liquid and at a point close to where the liquid increases in cross sectional area, discharging the liquid after its cross sectional area has been substantially increased into a relatively restricted area where said liquid descends towards the bottom of the receptacle, the flocculating slimes remaining on the bottom and the clear supernatant liquid flowing upward.

IGNACE J. KRCHMA.